（12） United States Patent
DeSoto

(10) Patent No.: US 6,211,794 B1
(45) Date of Patent: Apr. 3, 2001

(54) ANALOG ROTARY POSITION SENSOR

(75) Inventor: Michael George DeSoto, Apex, NC (US)

(73) Assignee: BorgWarner, Troy, MI (US)

( * ) Notice: Subject to any disclaimer, the term of this patent is extended or adjusted under 35 U.S.C. 154(b) by 0 days.

(21) Appl. No.: 09/543,957

(22) Filed: Apr. 6, 2000

(51) Int. Cl.[7] .................................................. G08B 21/00
(52) U.S. Cl. ............................ 340/686.1; 340/686.3; 340/456; 340/453; 475/199; 475/206
(58) Field of Search ......................... 340/686.1, 686.3, 340/456, 453; 475/199, 206

(56) References Cited

U.S. PATENT DOCUMENTS

| | | | |
|---|---|---|---|
| 5,052,245 | 10/1991 | Kigoshi | 74/665 |
| 5,111,180 | 5/1992 | Suzuki | 340/456 |
| 5,561,416 | 10/1996 | Marshall et al. | 340/456 |
| 5,609,219 | * 3/1997 | Watson et al. | 180/248 |
| 5,646,457 | 7/1997 | Vakavtchiev | 307/10.6 |
| 5,688,202 | * 11/1997 | Bowen | 475/199 |
| 5,702,321 | * 12/1997 | Bakowski et al. | 475/199 |
| 5,704,444 | * 1/1998 | Showalter | 180/247 |
| 5,743,143 | 4/1998 | Carpenter et al. | 74/335 |
| 5,845,538 | 12/1998 | Tornatore | 74/473.36 |
| 5,867,092 | 2/1999 | Vogt | 340/456 |
| 5,903,214 | 5/1999 | Watarai | 340/432 |

* cited by examiner

Primary Examiner—Daniel J. Wu
Assistant Examiner—Tai T. Nguyen
(74) Attorney, Agent, or Firm—Brinks Hofer Gilson & Lione; Greg Dziegielewski

(57) ABSTRACT

An analog output Hall effect sensor provides a proportional output representative of the angular position of a rotary shift member in a transfer case, transmission or the like. The rotary shift member is driven by a bidirectional electric motor through a speed reducing gear train. A wheel having a single spiral bipolar (N-S) magnetic track rotates with the output of the gear train and the shift member. The analog output Hall effect sensor is proximate the spiral magnetic track and provides an analog (ramp) output proportional to the position of the rotary shift member relative to first and second end points.

20 Claims, 4 Drawing Sheets

ANALOG ROTARY POSITION SENSOR

BACKGROUND OF THE INVENTION

The invention relates generally to devices for sensing the angular position of a rotating shaft and, more particularly, to devices for sensing the angular position of a rotating shift member in a transfer case or transmission and providing an analog output.

In motor vehicle drive line components such as transmissions and transfer cases, it is frequently necessary to provide accurate information to associated electronic controllers, readouts or indicators of the current operating position or condition of the device, such as the currently selected gear, overdrive, four-wheel drive, etc.

Both the sensor and the sensed component take many forms. One of the less complex devices is a multi-featured cam which is attached to and moves with a shift rail and which is engaged by a suitable multiple position sensor. As the cam and shift rail translate relative to the sensor, suitable on-off outputs are provided to a controller or readout which interprets or displays the signals as certain gears or operating conditions.

U.S. Pat. No. 5,867,092 utilizes an array of Hall effect sensors and magnets disposed adjacent an apertured plate which translates past the array of sensors. Such a configuration provides multiple outputs and multiple unique combinations of outputs corresponding to numerous small but finite positions of the shift member and thus provides improved definition of the shift member position to associated controllers or equipment.

A common design concern in such devices is the physical proximity of the sensor to the controlled or shifted device. If the sensor is coupled to the shift component by a hard mechanical connection, there is negligible likelihood that the sensor output and the shift component will assume inconsistent states. However, if the sensor is physically remote from the shifted component or operated or controlled through an auxiliary linkage, the possibility exists that the sensor will provide an output indicating that the shift component is in one position while, in fact, it is occupying another. Obviously, the better sensor/shift component designs are those that minimize this problem.

Another design concern may be the complexity of the sensor. Multiple binary, i.e., two position, sensors, through appropriate coding, can provide accurate information of multiple positions of a shift member. However, multiple sensors are accompanied by the possibility of a failure of one of the sensors which, unless appropriate diagnostic systems are included to detect such failures, may result in a controller misinterpreting the supplied data and provide inaccurate shift commands or indications regarding the current status of the shift member.

If, however, a single sensor is utilized to provide an appropriate position indicating signal, the failure of the single sensor, which typically results in either a total loss of signal or a constant level signal, can be relatively easily diagnosed. The present invention is directed to a closely coupled, rotary shift position sensing device having a single sensor.

SUMMARY OF THE INVENTION

An analog output Hall effect sensor provides a proportional output representative of the angular position of a rotary shift member in a transfer case, transmission or the like. The rotary shift member is driven by a bidirectional electric motor through a speed reducing gear train. A wheel having a single spiral bipolar (N-S) magnetic track rotates with the output of the gear train and the shift member. The analog output Hall effect sensor is proximate the spiral magnetic track and provides an analog (ramp) output proportional to the position of the rotary shift member relative to first and second end points.

It is thus an object of the present invention to provide a rotary shift member sensor having a Hall effect analog output device.

It is a further object of the present invention to provide a rotary shift member sensor which is directly coupled to and operated by the rotary shift member.

It is a still further object of the present invention to provide a position sensing assembly for a rotary shift member having a single sensing device which provides an output signal proportional to angular position.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1:
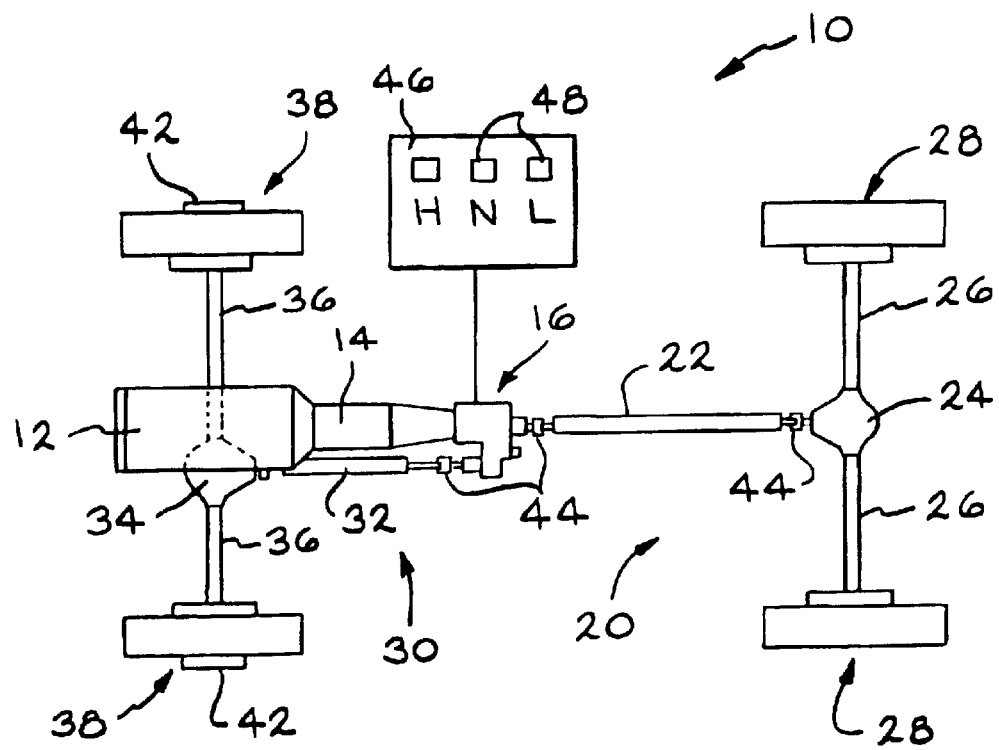
FIG. 1 is a diagrammatic view of a motor vehicle having primary and secondary drivelines and a transfer case incorporating the present invention.

Referring now to FIG. 1, a four-wheel vehicle drive train is diagrammatically illustrated and designated by the reference number 10. The four-wheel vehicle drive train 10 includes a prime mover 12 such as internal combustion or Diesel engine which is coupled to and directly drives a transmission 14. The transmission 14 may either be an automatic or manual type. The output of the transmission 14 directly drives a transfer case assembly 16 which provides motive power to a primary or rear driveline assembly 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front driveline assembly 30 comprising a secondary or front prop shaft 32, a secondary or front differential assembly 34, a pair of live secondary or front axles 36 and a respective pair of secondary or front tire and wheel assemblies 38. The front tire and wheel assemblies 38 may be directly coupled to a respective one of the pair of front axles 36 or, if desired, a pair of manually or remotely activateable locking hubs 42 may be operably disposed between the pair of front axles 36 and a respective one of the tire and wheel assemblies 38 to selectively connect same. Finally, both the primary driveline 20 and the secondary driveline 30 may include suitable and appropriately disposed universal joints 44 which function in conventional fashion to allow static and dynamic offsets and misalignments between the various shafts and components. A control console 46 which is preferably located within convenient reach of the vehicle operator includes a switch or a plurality of individual switches or push buttons 48 which facilitate selection of a particular operating mode of the transfer case assembly 16 as will be further described below.

Figure 3:
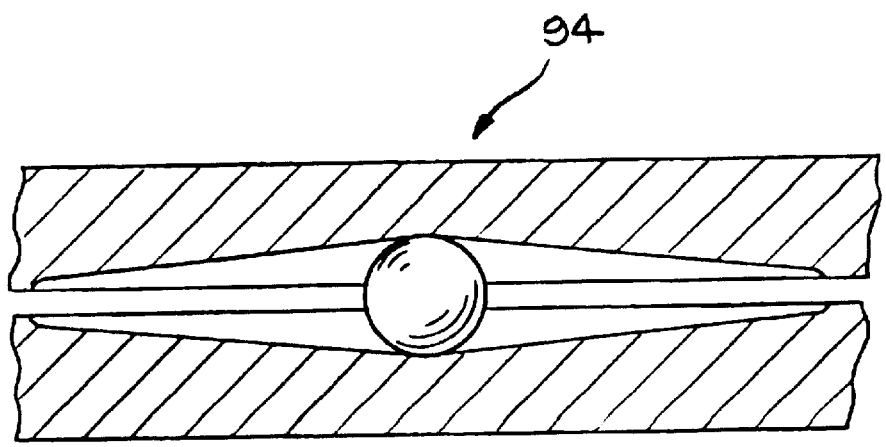
FIG. 3 is a flat pattern development of a portion of a ball ramp clutch operator assembly taken along line 3—3 of FIG. 2.
Figure 2:
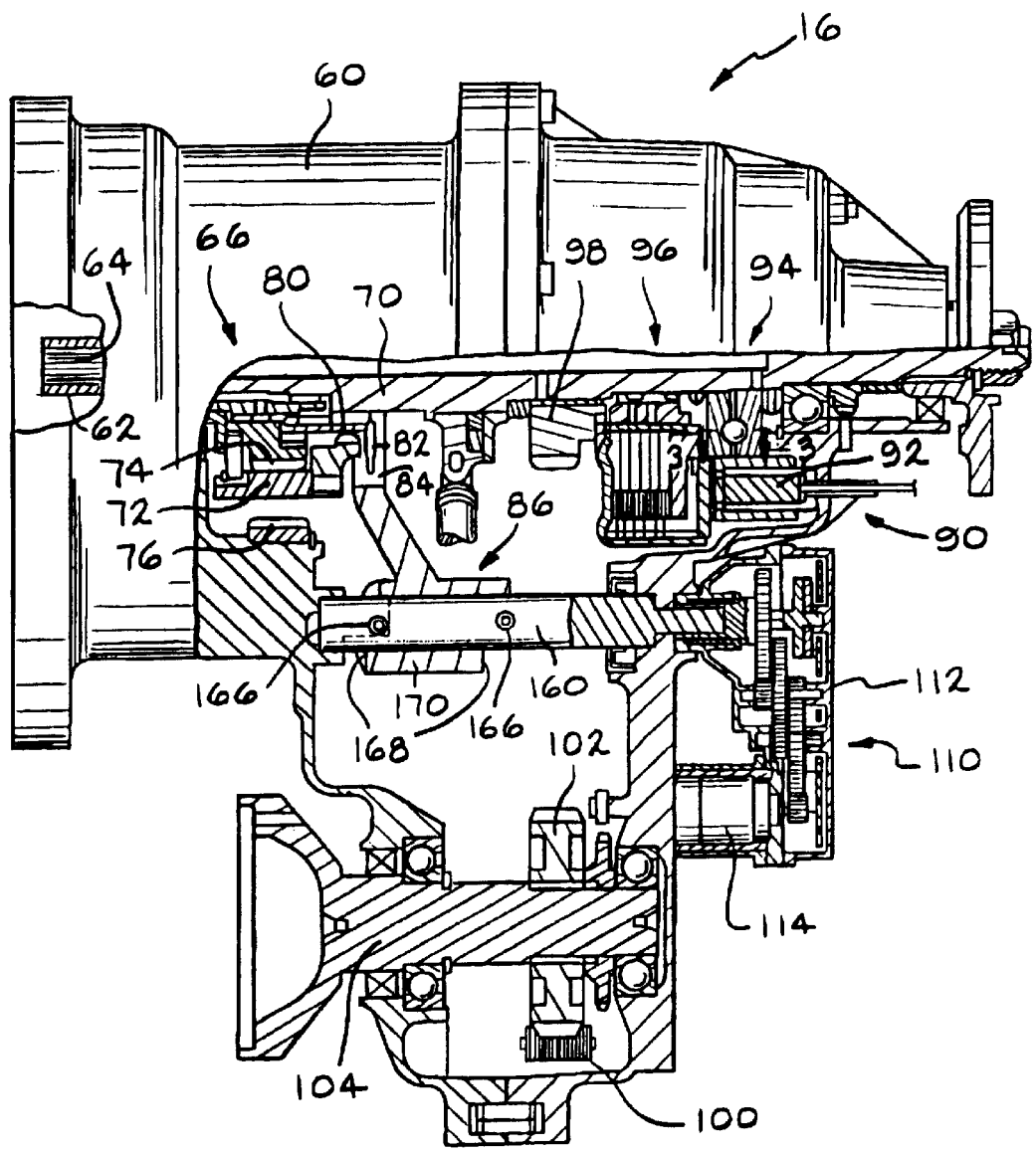
FIG. 2 is a side elevational view with portions broken away of a transfer case incorporating the present invention.

Referring now to FIGS. 2 and 3, the transfer case assembly 16 includes a multi-piece housing 60 having suitable flanges, openings, shoulders, bearing surfaces and blind apertures which receive, support and secure various elements and components of the transfer case assembly 16. For example, an input shaft 62 which is supported in a suitable ball bearing assembly (not illustrated) includes a splined opening 64 which receives a complementarily splined output shaft (not illustrated) of the transmission 14. The input shaft 62 drives a planetary gear speed reduction assembly 66. By bypassing the planetary gear speed reduction assembly 66 a high gear, direct drive mode is provided to a primary output shaft 70. By engaging the output of the planetary gear speed reduction assembly 66 a low gear, reduced speed output is provided to the primary output shaft 70. A neutral or non-driving mode is also preferably available. Selection of such operating modes is typically made by the vehicle operator through use of the switches 48 of the control console 46 or similar means.

The planetary gear speed reduction assembly 66 includes a planet carrier 72 which receives a plurality of pinion gears (not illustrated) which are in constant mesh with a sun gear 74, driven by and coupled to the input shaft 62, and a ring gear 76. A dog clutch 80 having suitable male or female axial splines is axially translatable from a leftmost position illustrated in FIG. 2 which directly couples the input shaft 62 to the primary output shaft 70, thereby providing high gear or direct drive, through a center, neutral position to a low gear, reduced speed drive in which the dog clutch 80 engages the planet carrier 72 to provide a reduced speed output. A flange 82 or other suitable feature on the dog clutch 80 is engaged by a yoke 84 of a shift fork assembly 86.

Typically, the transfer case assembly 16 also includes an electromagnetic clutch assembly 90 having an electromagnetic coil 92, a ball ramp operator assembly 94 and a multiple disc, friction clutch pack assembly 96 which controllably provides drive torque from the primary output shaft 70 to a chain drive sprocket 98 coupled to the output of the friction disc pack assembly 96. A chain 100 engages both the chain drive sprocket 98 and a driven chain sprocket 102 which in turn is coupled to and drives a secondary output shaft 104. Further details of the electromagnetic clutch assembly 90 and the ball ramp operator assembly 94 are described in U.S. Pat. Nos. 4,718,303 and 5,407,024 which are hereby incorporated by reference.

Figure 4:
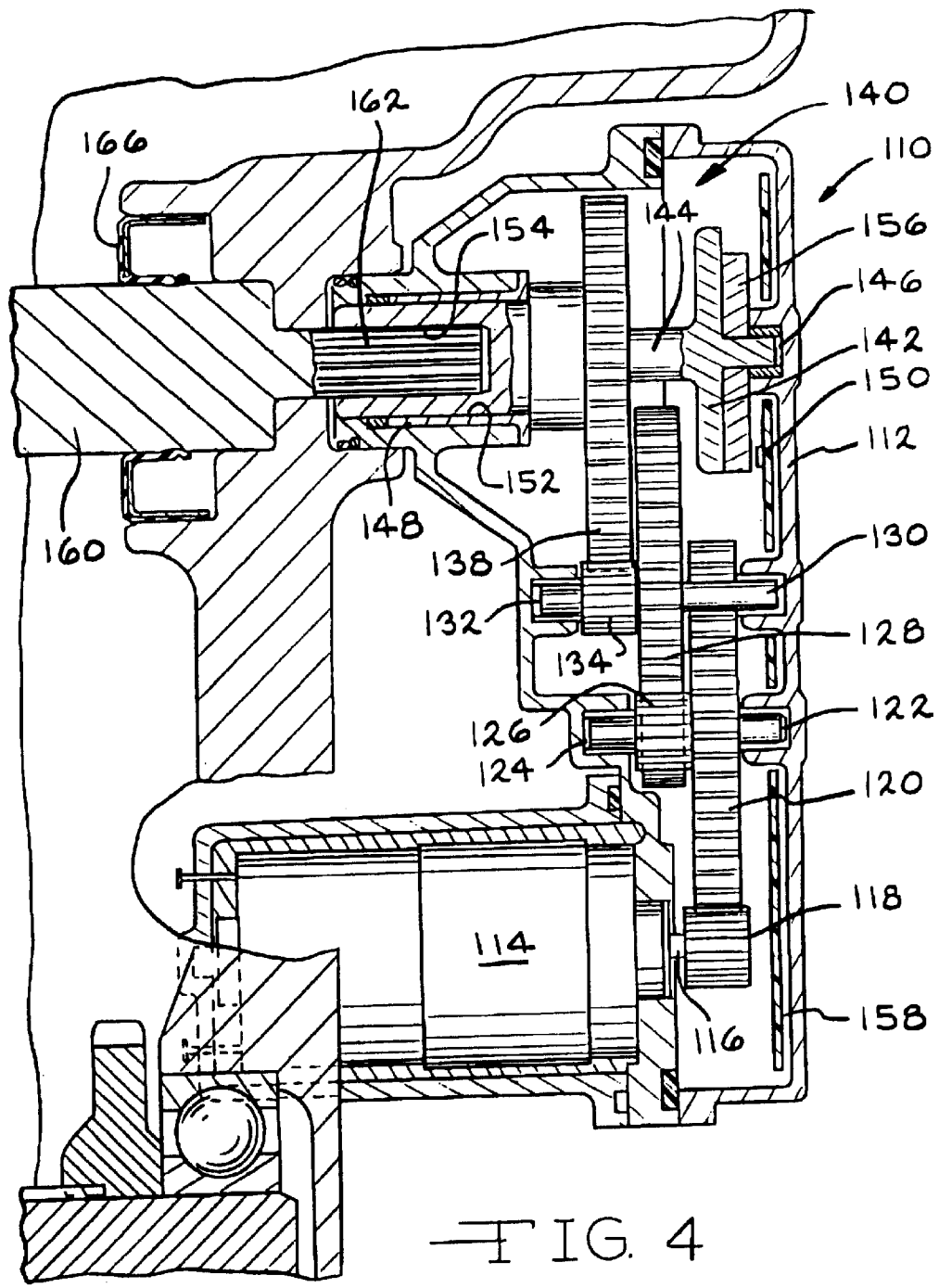
FIG. 4 is an enlarged, full sectional view of an electric shift mechanism incorporating the present invention.

Referring now to FIGS. 2 and 4, the position of the dog clutch 80 and the shift fork assembly 86 is commanded by a shift control assembly 110. The shift control assembly 110 is contained within an auxiliary housing 112. The auxiliary housing 112 includes various openings and bearings which receive components of the shift control assembly 110 and protects such components as well. Secured within the auxiliary housing 112 is an electric drive motor 114 having an output shaft 116 coupled to a drive pinion 118. The drive pinion 118 is in constant mesh with the teeth of a first spur gear 120 which is received upon a stub shaft 122 which seats within suitably disposed blind bores 124 formed in the auxiliary housing 112. The first spur gear 120 is coupled to or integrally formed with a second pinion gear 126 which effects a second speed reduction with a second spur gear 128. Similarly, the second spur gear 128 is secured to a stub shaft 130 which is received within suitable aligned blind bores 132 formed in the auxiliary housing 112. A third pinion gear 134 is integrally formed with or secured to the second spur gear 128 and effects a third speed reduction as it drives a third spur gear 138. The third spur gear 138 is fixedly secured to an output shaft assembly 140 and rotates therewith.

The output shaft assembly 140 includes a circular disc or plate 142 secured to or integrally formed with an output shaft 144. One end of the output shaft 144 is received within a blind bore 146 and a sleeve 148 disposed in a large through passageway 152 supports the other, enlarged end of the output shaft 144 which includes a splined bore 154. It will be appreciated that while a three stage speed reduction gear train has been shown, variations in motor speed and power, operating time requirements and shift torque requirements of the dog clutch 80 may require or permit more or fewer speed reduction stages.

Figure 6:
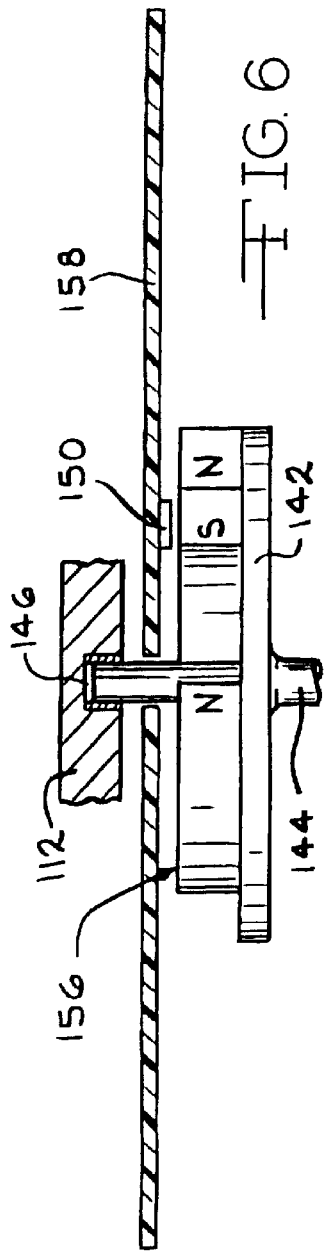
FIG. 6 is a side elevational view in partial section of a printed circuit board and circular plate of a rotary position sensor according to the present invention.
Figure 5:
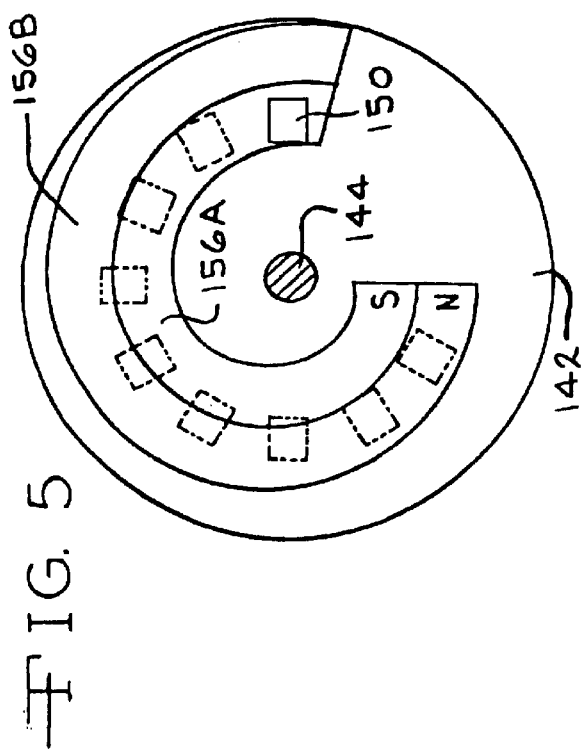
FIG. 5 is a plan view of a circular plate having a spiral magnetic pattern of a rotary position sensor according to the present invention.

Referring now to FIGS. 4, 5 and 6, the circular plate 142 includes a spiral, bipolar magnet or magnetic pattern or track 156. The spiral magnet or magnetic track or pattern 156 preferably extends over about 300° but may be longer or shorter if desired, typically in the range of from 240° to 320°. A longer track 156 improves angular resolution while a shorter track 156 reduces angular resolution. Clearly, the angular extent of the magnetic track or pattern 156 is related to the configuration of the shift fork assembly 86, the total axial motion required of the dog clutch 80, and power and timing constraints placed on the shift system.

The magnetic track or pattern 156 is medially divided into an inner portion 156A which may be a magnetic South pole and an outer portion 156B which may be a magnetic North pole. If desired, these pole configurations may be reversed. Disposed proximate the face of the magnetic track or pattern 156 opposite the circular plate 142 is a single analog Hall effect sensor 150. The spiral magnetic track or pattern 156 and the single Hall effect sensor 160 are positioned such that at one end of rotation of the circular plate 142, the sensor 160 is fully or substantially fully disposed over one of the portions 156A or 156B and, at the opposite end of rotation the Hall effect sensor 160 is disposed fully or substantially fully over the other or remaining portion 156A and 156B. As the circular plate 142 and the magnetic track or pattern 156 rotate between the first end stop and the second end stop, and as illustrated in FIG. 5, the position of the Hall effect sensor 150 relative to the magnetic tracks 156A and 156B slowly changes from being influenced only by either the North or South magnetic pole to the South or North magnetic pole.

Preferably, the single Hall effect sensor 150 is a three terminal device, a first terminal receiving a constant drive or reference voltage, a second terminal providing a ramp signal output which varies from substantially the full applied voltage to zero as the sensed portions 156A and 156B of the magnetic pattern 156 rotate and shift flux polarity and a third, ground terminal. The Hall effect sensor 150 is preferably secured to a printed circuit board 158 disposed within the housing 112. The printed circuit board 158 may include other electronic components (not illustrated) associated with drive circuitry for the electric drive motor 114.

Referring now briefly to FIGS. 2 and 4, a shift shaft or rail 160 includes a splined, reduced diameter portion 162 which is received within the splined bore 154 of the output shaft 144. A suitable oil seal 166 may be provided about the shift rail 160 at the interior of the transfer case housing 60. The shift rail 160 preferably includes a pair of spaced apart cam followers 166 which engage a pair of symmetrical opposed helical cams 168 on opposite ends of a tubular body 170 of the shift fork assembly 86 which is received upon the shift rail 160. It will be appreciated that bidirectional rotation of the shift rail 160 and interaction of the cam followers 166 and the helical cams 168 causes bi-directional translation of the shift fork assembly 86 thereby effecting selection of high gear (direct) drive, neutral, or low gear (reduced speed) drive as described above. This rotation of the shift rail 160 is, of course, directly duplicated by rotation of the circular plate 142 and thus provides a change of the magnetic field or flux sensed by the single Hall effect sensor 150 as the spiral tracks 156A and 156B shift the polarity of the magnetic flux from substantially full North to substantially full South or vice versa.

Figure 7:
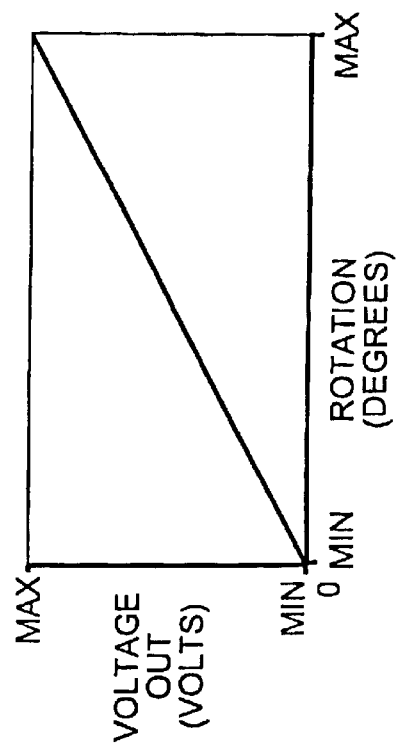
FIG. 7 is a graph qualitatively presenting the relationship between the output of the rotary position sensor according to the present invention relative to angular shaft position.

As illustrated in FIG. 7, the single Hall effect sensor 150 provides an analog, ramp output which, due to the hard connection between the circular plate 142, the shift rail 160, the shift fork assembly 86 and the dog clutch 80, provides an output accurately and positively indicating the position of the dog clutch 80 without the possibility of an erroneous output signal due to a disparity between the actual position of the dog clutch 80 and the Hall effect sensor 150 relative to the magnetic tracks 156A and 156B.

Thus it will be appreciated that the analog rotary position sensor of the present invention is a position sensor that provides a highly accurate, i.e., repeatable, output and one that is accurate relative to the position of the dog clutch 80 and the shift fork 86 due to a hard, i.e., direct and non-resilient or flexible, connection between the dog clutch 80, the circular plate 142 and the magnetic pattern 156.

The foregoing disclosure is the best mode devised by the inventor for practicing this invention. It is apparent, however, that apparatus incorporating modifications and variations will be obvious to one skilled in the art of angular position sensors. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. An analog rotary position sensor comprising, in combination,
    a motor,
    a speed reduction assembly having an input driven by said motor and a rotary output,
    a shift member driven by said rotary output,
    a shift mechanism driven by said shift member and adapted to translate a clutch between at least a first position providing a first driving connection and a second position providing a second driving connection,
    a spiral magnet having North and South poles and disposed for rotation with said shift member and,
    a Hall effect sensor disposed adjacent said spiral magnetic pattern.

2. The analog rotary position sensor of claim 1 wherein said motor is an electric motor.

3. The analog rotary position sensor of claim 1 wherein said speed reduction assembly includes a plurality of pinion gears and spur gears.

4. The analog rotary position sensor of claim 1 further including a housing and wherein said Hall effect sensor is disposed upon a printed circuit board mounted within said housing.

5. The analog rotary position sensor of claim 1 further including a motor vehicle transfer case having a planetary gear speed reduction assembly and wherein said first position of said clutch selects direct drive and said second position of said clutch selects a reduced speed output of said planetary gear reduction assembly.

6. The analog rotary position sensor of claim 1 wherein said spiral magnet extends over at least 240°.

7. The analog rotary position sensor of claim 1 wherein said shift mechanism is a shift fork having at least one helical cam engaged by a follower on said shift member.

8. A rotary position sensor comprising, in combination,
    a drive mechanism having a rotary output,
    a member driven by said rotary output,
    a shift mechanism driven by said member and adapted to translate a clutch between a first position and a second position,
    a spiral magnet having North and South poles disposed for rotation with said shaft and,
    a Hall effect sensor disposed adjacent said magnetic pattern,
    whereby said Hall effect sensor provides a ramp output as said magnet pattern moves adjacent said sensor.

9. The rotary position sensor of claim 8 wherein said drive mechanism includes an electric motor and a gear train.

10. The rotary position sensor of claim 9 wherein said gear train includes a plurality of pinion gears and spur gears.

11. The rotary shaft position sensor of claim 8 further including a motor vehicle transfer case having a planetary gear speed reduction assembly and wherein said first position of said clutch selects direct drive and said second position of said clutch selects a reduced speed output of said planetary gear reduction assembly.

12. The rotary shaft position sensor of claim 8 wherein said spiral magnet extends over at least 240°.

13. The rotary shaft position sensor of claim 8 wherein said shift mechanism is a shift fork having at least one helical cam engaged by a follower on said shift member.

14. A rotary shaft position sensor comprising, in combination,
    a shaft having an axis and disposed for rotation about said axis,
    a spiral magnet having North and South poles disposed for rotation with said shaft, and
    an analog Hall effect sensor disposed adjacent said magnetic pattern,
    whereby said analog Hall effect sensor provides a ramp output as said spiral magnet rotates adjacent said sensor.

15. The rotary shaft position sensor of claim 14 further including a drive mechanism having an electric motor and a rotary output coupled to said shaft.

16. The rotary shaft position sensor of claim 15 wherein said spiral magnet is operably secured to said rotary output.

17. The rotary shaft position sensor of claim 14 further including a shift mechanism operably coupled to said shaft and adapted to translate between a first position and a second position.

18. The rotary shaft position sensor of claim 17 further including a motor vehicle transfer case having a planetary gear speed reduction assembly and wherein said first position of said clutch selects direct drive and said second position of said clutch selects a reduced speed output of said planetary gear reduction assembly.

19. The rotary shaft position sensor of claim 14 further including a shift fork disposed on said shaft, said shift fork defining at least one helical cam and at least one cam follower mounted upon said shaft.

20. The rotary shaft position sensor of claim 14 further including a housing and wherein said analog Hall effect sensor is disposed upon a printed circuit board mounted within said housing.

\* \* \* \* \*